May 11, 1937.  F. W. STEINACKER  2,080,153
CORD FASTENER OR HOLDER
Filed Feb. 12, 1936
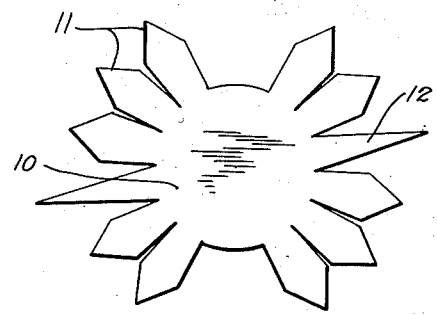
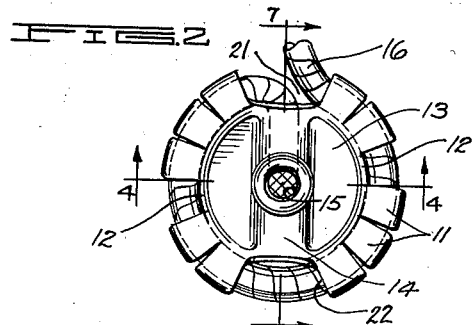
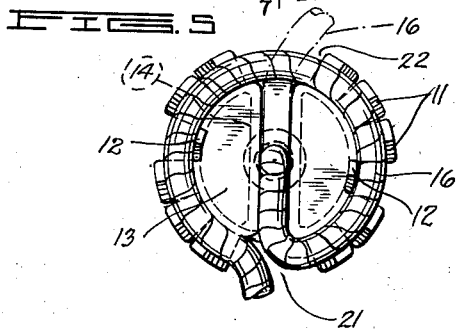
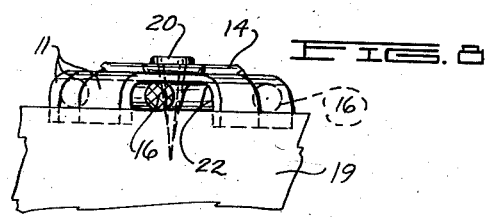
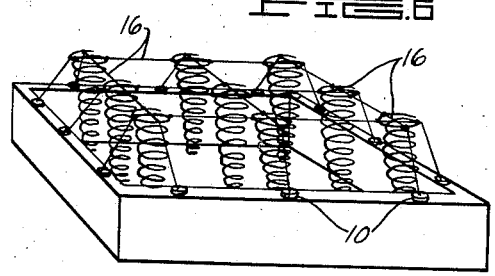
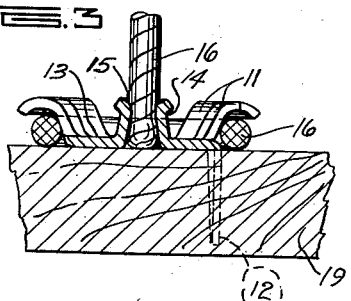
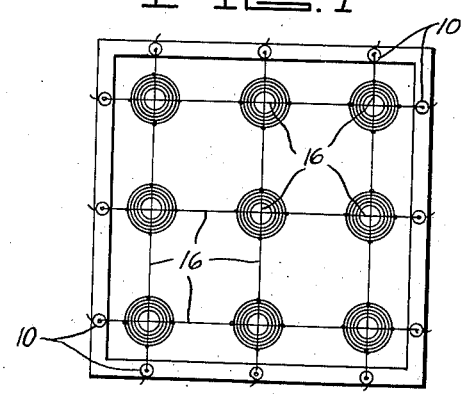
INVENTOR
FRANK W. STEINACKER
BY John A. Bommhardt
ATTORNEY Patented May 11, 1937

2,080,153

UNITED STATES PATENT OFFICE 2,080,153

CORD FASTENER OR HOLDER

Frank W. Steinacker, Cleveland, Ohio; Martha Steinacker executrix of said Frank W. Steinacker, deceased Application February 12, 1936, Serial No. 63,508

5 Claims. (Cl. 155—179)

This invention relates to a device for fastening the ends of the twine or cord which holds the springs in upholstery construction.

The primary object of my invention is to provide a secure fastening means for the ends of the twine.

As now practised in upholstery work, the end of the twine or cord is fastened by means of tacks, the heads of which, as a rule, have more or less sharp edges and have a tendency to cut the twine with the result that the upholstery springs are put out of alignment. The present invention avoids this objection and also provides a fastener which is secure and may be quickly and easily applied.

I accomplish this principal object and others which will hereinafter appear, by the means illustrated in the accompanying drawing, in which:

Fig. 1 is a plan view of the fastener blank or stamping.

Fig. 2 is a plan view of the device in completed applied position.

Fig. 3 is a sectional view showing the position of the device with cord inserted.

Fig. 4 is a section taken on line 4—4 of Fig. 2, showing the method of clamping the cord and application of the device.

Fig. 5 is a bottom view showing cord in position.

Fig. 6 is a perspective view showing the method of using the device.

Fig. 7 is a plan view of Fig. 6.

Fig. 8 is a modification, in elevation, of the forms shown in Figs. 1 to 5 inclusive, but which eliminates the points shown in these figures and shows instead the application of a tack through the center aperture.

Referring to the illustration, a stamping or disk 10 as shown in Fig. 1 has a plurality of projecting fingers 11 of such shape as shown and also a pair of tapered prongs 12 which may be located substantially as shown, if, however, more than two are desired they may be spaced equally distant each from the other.

After stamping, the disk is drawn substantially as shown in Fig. 3, when a circular center portion 13 is depressed and an elongated portion 14 through the center thereof is raised, having an aperture 15 in the exact center of said raised portion.

In its application the device has its tapered points 12 turned downward as shown in Figs. 2, 3, 4, and 5, to penetrate the wood 19 when hammered into the position shown in Fig. 3.

A cord 16 is threaded downward through the aperture 15 in the elongated portion 14 and then drawn around the inner wall 17, so that it encircles the device, or it may be threaded through the entire length of the elongated portion 14 and the edges of the projecting fingers 11 are then bent or clamped down as shown in Figs. 2, 4, 5, and 8, thus securely holding the cord 16 within the circular passage 18 thus formed and so preventing the cord 16 from slipping. After the cord 16 is passed through the center elongated portion 14 and wound around the inner wall 17 under the fingers 11 as shown in Fig. 3, the said fingers are then hammered down, as shown in Fig. 4, to bind and fasten cord 16.

In the modification shown in Fig. 8, the prongs 12 are eliminated and a tack 20 is driven through the aperture 15 to secure the device, the cord 16 then being drawn around the inner wall 17 after passing entirely through the elongated portion 14, the said cord entering the device by the opening 21 and leaving through the opening 22 on the apposed side. This is shown by the modified Fig. 8 and the dotted outline of the cord 16 in Fig. 5.

Figs. 6 and 7 show the application of the device.

I claim:

1. A cord or rope fastener comprising a disk having a raised portion provided with an aperture therein, and a plurality of upwardly bent fingers extending radially from the disk, said upwardly bent fingers forming a channel wherein a cord may be confined when the fingers are depressed.

2. A cord or rope fastener comprising a disk having an elongated raised central portion having an aperture therein, two or more prongs extending from the periphery of said disk, and fingers struck up and extending radially from said disk, said fingers when depressed serving to hold a cord or the like which has been placed thereunder.

3. A cord or rope fastener comprising a disk, a raised center portion formed in the disk having an opening therein, a plurality of upwardly bent fingers and a pair of prongs extending from the edge of the disk, said fingers defining a channel, and adapted to hold a cord or the like disposed in said channel and extending under the raised portion and thence out through the opening.

4. A cord or rope fastener comprising a disk having a series of upwardly bent fingers projecting from the edge thereof and forming a channel around the edge of the disk to receive a cord or the like, and driving prongs projecting from the edge of the disk to fasten the same to a frame or the like, the fingers being flexible and adapted to be bent down upon the cord to hold the same in the channel.

5. A cord or rope fastener as in claim 4, the disk having a diametrical raised portion provided with a hole through which the cord may be passed.

FRANK W. STEINACKER.